United States Patent
Mtauweg

(10) Patent No.: US 11,111,902 B2
(45) Date of Patent: Sep. 7, 2021

(54) NACELLE AND ROTOR FOR A WIND TURBINE, AND METHOD

(71) Applicant: Wobben Properties GmbH, Aurich (DE)

(72) Inventor: Samer Mtauweg, Bremerhaven (DE)

(73) Assignee: Wobben Properties GmbH, Aurich (DE)

( * ) Notice: Subject to any disclaimer, the term of this patent is extended or adjusted under 35 U.S.C. 154(b) by 31 days.

(21) Appl. No.: 16/322,045

(22) PCT Filed: Jul. 31, 2017

(86) PCT No.: PCT/EP2017/069269
§ 371 (c)(1),
(2) Date: Jan. 30, 2019

(87) PCT Pub. No.: WO2018/024652
PCT Pub. Date: Feb. 8, 2018

(65) Prior Publication Data
US 2019/0186462 A1 Jun. 20, 2019

(30) Foreign Application Priority Data
Aug. 1, 2016 (DE) .................. 10 2016 114 184.4

(51) Int. Cl.
*F03D 7/02* (2006.01)
(52) U.S. Cl.
CPC ......... *F03D 7/0224* (2013.01); *F03D 7/0204* (2013.01); *F05B 2260/74* (2013.01); *Y02E 10/72* (2013.01)

(58) Field of Classification Search
None
See application file for complete search history.

(56) References Cited

U.S. PATENT DOCUMENTS

| | | | |
|---|---|---|---|
| 4,798,104 A * | 1/1989 | Chen | F16H 25/06 475/159 |
| 6,609,889 B1 | 8/2003 | Vilsboll | |
| 8,075,266 B2 | 12/2011 | Keller et al. | |
| 8,405,243 B2 | 3/2013 | Siegfriedsen | |
| 8,823,227 B2 | 9/2014 | Bayer | |
| 9,416,772 B2 | 8/2016 | Altemark et al. | |
| 9,869,298 B2 * | 1/2018 | Rosenvard | F03D 7/04 |

(Continued)

FOREIGN PATENT DOCUMENTS

| | | | |
|---|---|---|---|
| DE | 2635616 | * | 8/1976 |
| DE | 19920504 C2 | | 2/2002 |

(Continued)

*Primary Examiner* — Ninh H. Nguyen
*Assistant Examiner* — Jason Fountain
(74) *Attorney, Agent, or Firm* — Seed IP Law Group LLP

(57) ABSTRACT

A nacelle for a wind power installation, a rotor for a wind power installation, a wind power installation, use of a planetary-gearbox-free electric actuator drive, a method for wind direction tracking of a nacelle, and a method for rotor blade adjustment of rotor blades of a rotor are provided. Provided is a nacelle for a wind power installation, in particular a wind power installation having a nominal output of more than 3000 kilowatts (kW), having at least one azimuth drive which is used for the wind direction tracking of the nacelle and which is configured as a planetary-gearbox-free electric actuator drive.

13 Claims, 5 Drawing Sheets

(56) References Cited

U.S. PATENT DOCUMENTS

| | | | |
|---|---|---|---|
| 10,250,817 B2 * | 4/2019 | Gharabegian | ........... A45B 23/00 |
| 2009/0232652 A1 | 9/2009 | Keller et al. | |
| 2011/0254272 A1 | 10/2011 | Lee | |
| 2013/0115043 A1 * | 5/2013 | Rosenvard | ............ F03D 7/0224 |
| | | | 415/1 |
| 2015/0369213 A1 | 12/2015 | Jakobsson et al. | |
| 2017/0204837 A1 * | 7/2017 | Hartmann | ................. F03D 9/25 |
| 2017/0324908 A1 * | 11/2017 | Gharabegian | ........... A45B 15/00 |

FOREIGN PATENT DOCUMENTS

| | | | | |
|---|---|---|---|---|
| DE | 202007009660 U1 | 9/2007 | | |
| DE | 202008010748 U1 | 10/2008 | | |
| DE | 102013206878 A1 | 10/2013 | | |
| DE | 102013207322 A1 | 10/2014 | | |
| DE | 102008013864 B4 | 12/2014 | | |
| EP | 1105645 | 2/2000 | | |
| EP | 1650431 B1 | 9/2012 | | |
| EP | 2902622 A1 * | 8/2015 | ............. | F03D 80/88 |
| EP | 2915999 A1 | 9/2015 | | |
| JP | S6293446 U | 6/1987 | | |
| JP | 2015140777 A | 8/2015 | | |
| JP | 2016505119 A | 2/2016 | | |
| RU | 2450159 C2 | 5/2012 | | |
| SU | 199773 A1 | 7/1967 | | |
| WO | 0009885 A1 | 2/2000 | | |
| WO | 2009071228 A1 | 6/2009 | | |

\* cited by examiner

NACELLE AND ROTOR FOR A WIND TURBINE, AND METHOD

BACKGROUND

Technical Field

The invention relates to a nacelle for a wind power installation, to a rotor for a wind power installation, to a wind power installation, as well as to a use of a planetary-gearbox-free electric actuator drive, to a method for the wind direction tracking of a nacelle, and to a method for the rotor blade adjustment of rotor blades of a rotor.

Description of the Related Art

A wind power installation converts the energy of the wind to electric power. The predominant construction mode of wind power installations is the triple-bladed wind power installation having a horizontal rotor shaft and the rotor on the windward side when in operation, the nacelle of said wind power installation being disposed on a tower and actively tracking the wind direction. This active tracking of the nacelle so as to depend on the wind direction is typically implemented by an azimuth drive. The rotor blades of a wind power installation can moreover be preferably rotated about the longitudinal axis of said rotor blades in that the latter are rotatably mounted and are able to be rotated by a so-called pitch drive. The angle of attack of the rotor blades in relation to a currently prevailing wind direction can be modified by said rotation and the output of the rotor blades can thus be actively controlled. The rotating speed of the wind power installation can be significantly influenced by way of the angle of attack.

In order for the performance capability to be improved and the costs of wind power installations to be reduced, the trend of the installations having increasingly larger construction modes and/or higher nominal outputs can be seen. The larger construction mode relates in particular to the rotor diameter and/or to the hub height of wind power installations. Higher forces than is the case in smaller construction modes typically arise by virtue of the larger dimensions, in particular those of the rotor. Said higher forces act, for example, on the drivetrain of the wind power installation. The components of the drivetrain are generally embodied so as to be larger and/or stronger by virtue of the more highly stressed drivetrain. This generally results in that a majority of the drivetrain components of a wind power installation have a very high weight and/or a large space requirement. This results in an accordingly large dimensioning, for example of the gondola and/or of the nacelle, and thus also in an impingement of the structural components of the wind power installation by high weight forces.

Apart from said high static forces, it has to be noted that the dynamic forces that act on a wind power installation and/or the individual components of a wind power installation can likewise increase, in particular by way of a larger construction mode and/or a higher nominal output of the wind power installation. In order for the functionality and safety to be guaranteed, many components of the wind power installation are increasingly dimensioned so as to be larger on account of the increasing static and dynamic forces. Consequently, higher costs arise, and the risk of undeterminable damage also increases. Moreover, the assembly and the maintenance of wind power installation components of such a size are associated with a significantly higher complexity than is the case in smaller wind power installations. The costs in the case of large wind power installations can therefore increase in a disproportionate manner. The existing devices and methods for operating such devices do indeed offer various advantages, but further improvements are desirable.

The German Patent and Trademark Office in the priority application pertaining to the present application has researched the following prior art: DE 199 20 504 C2, DE 10 2008 013 864 B4, DE 10 2013 206 878 A1, DE 10 2013 207 322 A1, DE 20 2007 009 660 U1, DE 20 2008 010 748 U1, EP 1 650 431 B1, EP 2 915 999 A1.

BRIEF SUMMARY

A weight-optimized and/or space-optimized construction mode of a wind power installation as well as an improved assembly and/or maintenance of the wind power installation are provided. Also provided is a solution which enables wind power installations to be provided in a more cost-effective manner.

According to a first aspect of the invention, provided is a nacelle for a wind power installation, in particular a wind power installation having a nominal output of more than 3000 kilowatt (kW), having at least one azimuth drive which is used for the wind-direction tracking of the nacelle and which is configured as a planetary-gearbox-free electric actuator drive.

A wind power installation is presently in particular understood to be a horizontal-axis wind power installation which is in particular characterized in that the rotor when in operation sweeps an area which is aligned so as to be substantially vertical in relation to the surface of the Earth, an has a rotor axis which has substantially a horizontal alignment. Such wind power installations are also referred to as horizontal-axis wind power installations. A wind power installation is furthermore in particular understood to be a wind power installation having a nominal output of more than 500 kW, and/or more than 1000 kW, and/or more than 1500 kW, and/or more than 2000 kW, and/or more than 2500 kW, and/or more than 3000 kW, and/or more than 3500 kW, and/or more than 4000 kW, and/or more than 4500 kW, and/or more than 5000 kW, and/or more than 5500 kW, and/or more than 6000 kW.

The nacelle when in operation is preferably disposed on a tower top end of a wind power installation tower. The tower top end of the tower is that end of the tower which when in operation faces away from the foundation of the tower. The nacelle per se preferably comprises a rotor shaft, a rotor shaft brake, a machine support, a generator, and/or optionally a gearbox as well as a clutch. A gearbox and an associated clutch are typically provided only in the case of such wind power installations which do not have a direct drive such that a transmission is provided. The nacelle can moreover have components of the azimuth drive, wherein a motor and/or one, two, or a plurality of gearbox stages can be disposed within the nacelle, for example.

The nacelle is preferably disposed on the tower in such a manner that the nacelle is rotatable about an axis. The nacelle is furthermore preferably disposed in such a manner that said nacelle can be rotated about a substantially vertical longitudinal axis of the tower or an axis parallel to said longitudinal axis, such that the nacelle can be rotated in a substantially horizontal plane. For this purpose, the nacelle on the tower top end of the tower is typically mounted by way of a roller bearing and/or a friction bearing. The tower moreover at the tower top end typically has a ring mount which is typically configured as a circular element having an internal toothing and/or an external toothing. The azimuth drive typically engages on said ring mount by way of a sprocket, such that a rotation of the nacelle about an axis of the tower is enabled by rotating the sprocket on said ring mount.

The invention is inter alia based on the concept that the pursued higher nominal outputs and larger construction modes that in most instances result on account thereof of wind power installations result in that the azimuth drives likewise require larger installation sizes or a higher number of azimuth drives in order for the higher loads to be able to be moved according to the requirements. The larger installation sizes of the azimuth drives therefore result in a further space requirement. The size of the azimuth drives influences in particular also the installation size of the nacelles. Nevertheless, the azimuth drives, seen from a functional perspective, are to be designed in such a manner that said azimuth drives can rotate the nacelles weighing several tons on the tower. This results in particular in that the azimuth drives per se have a high weight and assume a large construction mode. For example, an azimuth drive in the direction of rotation axis can assume an extent of 1.3 meters. While a reduction in terms of said extent has already been able to be achieved by constructive measures, any further potential for reducing said extent by way of conventional planetary gearboxes appears not to exist or to exist only with a high complexity.

The weight and the size of, inter alia, the azimuth drives, and thus also of the nacelles is reduced as described herein. Currently used planetary gearboxes in azimuth drives often do not meet the above-mentioned requirements. While up to now planetary gearboxes have been largely used in particular in the case of large wind power installations, a multiplicity of advantages can be achieved by finding an alternative.

This is achieved in that planetary-gearbox-free electric actuator drives are used for the at least one azimuth drive of the wind power installation.

An azimuth drive generally comprises a motor, a gearbox, and a sprocket, the latter engaging in a toothing at the tower top end, in particular in the ring mount, of the tower. The gearbox serves in particular for converting an output movement of the motor to a movement having a minor rotating speed and a high torque, the sprocket being driven by said movement. By virtue of a maximum gearing ratio of one gearbox stage of a planetary gearbox, a plurality of planetary gearboxes are preferably disposed behind one another in order for the gearbox for the azimuth drive to be implemented. Three or more planetary gearbox stages are preferably provided so as to implement the required gearing.

A planetary gearbox, also referred to as a revolving gearbox, is understood to be a gearbox which preferably has at least one input shaft and one output shaft, as well as a revolving axis. A planetary gearbox typically has a centrically disposed sun gear and a ring gear which is radially spaced apart from the sun gear and is disposed so as to be coaxial with said sun gear. The ring gear furthermore preferably has an internal toothing. The radial spacing between the sun gear and the ring gear is bridged by way of at least one preferably externally toothed revolving gear in that the latter during meshing carries out a frictional and/or rolling movement on the sun gear and the ring gear. The at least one revolving gear is typically disposed on the revolving axis. A planetary gearbox is in particular distinguished in that said planetary gearbox has an input shaft and an output shaft, wherein the input shaft and the output shaft are coupled to one another by way of at least one revolving gear that revolves. Alternatively, a planetary gearbox can also have transmission elements which do not have any toothing. In principle, the transmission of forces in the context of a planetary gearbox is also possible by adhesive forces, for example.

In order inter alia for more compact azimuth drives to be provided, planetary-gearbox-free electric actuator drives are therefore provided. Furthermore, an azimuth unit which is specially provided for the azimuth drive is disposed in many wind power installations. The azimuth unit is preferably configured as a shaft portion and is disposed between the tower and the nacelle. The azimuth unit is typically part of the nacelle and preferably connected to the latter in a rotationally rigid manner. An azimuth unit of this type by way of a planetary-gearbox-free electric actuator drives optionally no longer required or required only in a size-reduced construction mode.

Planetary-gearbox-free electric actuator drives furthermore enable a very high gearing per gearbox stage, for example in the range from 250 to 350, or in the range from 10 to 100, such that the planetary-gearbox-free electric actuator drive requires a lower number of gearbox stages. The installation size can thus be reduced, since planetary gearboxes for applications of this type typically achieve a maximum gearing from 4 to 8, or from 4 to 10. On account of the use of planetary-gearbox-free electric actuator drives, the extent, in particular in a manner orthogonal to a rotation axis, of the gearbox can be reduced by more than 20%. The current construction length of more than 155 centimeters (cm), and/or more than 185 cm, and/or more than 221 cm, can thus be significantly reduced.

On account of the planetary-gearbox-free electric actuator drives having a non-planetary gearbox, a higher output density and/or a higher load bearing capability and/or a higher torsional rigidity and/or a higher load bearing capability in the azimuth drives can be achieved. Moreover, the gearbox can be provided with less play, and is furthermore suitable for the transmission of high torques. The planetary-gearbox-free electric actuator drives furthermore enable a higher flexibility in design and the optimization of the structural components. The planetary-gearbox-free electric actuator drives moreover typically have a lower weight such that said planetary-gearbox-free electric actuator drives are easier to handle in terms of assembly and/or maintenance. Furthermore, the motor brake, if required, can be provided in or ahead of, respectively, the first gearbox stage, such that a further space requirement can be reduced. The number of azimuth drives required can moreover optionally be reduced.

In one preferred variant of embodiment of the nacelle it is provided that the at least one azimuth drive is disposed on a machine support of the nacelle. On account of the disposal of the at least one azimuth drive on the machine support of the nacelle it is preferably guaranteed that the at least one azimuth drive is not disposed in the tower top, or is disposed in the latter only to a minor proportion. An azimuth unit which is substantially provided for providing the azimuth drives is thus not required, or only required in a size-reduced construction mode. The disposal is in particular to be understood such that the at least one azimuth drive is substantially disposed so as not to be within the tower, wherein individual components of the azimuth drive can nevertheless protrude into the tower. This can be effected, for example, by the disposal of the ring mount within the tower, since the sprocket associated with the azimuth drive in this case could protrude into the tower. The drive per se, as well as a majority of the further components of the azimuth drive, are however preferably disposed within the nacelle and thus not within the tower.

According to one further particularly preferred variant of embodiment of the nacelle it is provided that the at least one azimuth drive is partially or completely disposed within a cavity of the machine support of the nacelle. Machine supports can be configured as a tubal element. Said machine supports preferably have two entries which are configured as openings, the passage directions of said entries preferably not being disposed so as to be parallel. Rather, the passage directions of said openings can be disposed so as to be substantially mutually orthogonal.

On account of this disposal it is guaranteed that the machine support having a first opening can be disposed so as to be rotatable on the tower and in the assembled state thus has a vertical passage direction of the first opening. A machine support of this type furthermore has a second opening which has a passage direction that is orthogonal to the passage direction of the first opening such that said passage direction when in operation is horizontally aligned. A horizontally aligned rotor shaft can be disposed coaxially on that portion of the machine support that has the second opening. A machine support of this type is typically a compact component, wherein existing electric actuator drives having a planetary gearbox typically have a construction mode that is too large to be disposed in a machine support of this type. On account of the planetary-gearbox-free electric actuator drives which configure the at least one azimuth drive, there is henceforth the possibility of the azimuth drives being used within a machine support configured in such a manner. On account of the disposal of the azimuth drive within the cavity of the machine support, space which can either be utilized for other components of the wind power installation or can be used for reducing the size of the gondola can be saved in the surroundings of the machine support.

According to one further particularly preferred variant of embodiment of the nacelle it is provided that the cavity of the machine support is configured as a housing for the at least one azimuth drive. On account of the disposal of the at least one azimuth drive within the cavity of the machine support there is henceforth the possibility that the azimuth drive per se has no housing, since a largest possible shielding from surrounding interfering elements can be guaranteed on account of the disposal of the azimuth drive within the cavity of the machine support. On account thereof, weight can be saved, and the installation size of the azimuth drive can also be reduced in size.

According to one further variant of embodiment of the nacelle it is provided that the planetary-gearbox-free electric actuator drive of the at least one azimuth drive comprises a gearbox having one gearbox stage or having to gearbox stages. The planetary gearboxes usually used typically have a plurality of gearbox stages in order for a typically high motor rotating speed to be converted to a low sprocket rotating speed by way of the gearing created. The rotating speed of the motor in azimuth drives can be, for example, in the range between 900 to 3600 revolutions per minute. The rotating speed of the gondola in turn typically is only 0.25 to 1 arc degrees per second. The gearing from an output sprocket of the azimuth drive to a ring gear of the wind power installation can be between, for example, 9 and 13, or else between 9 and 15, wherein said gearing is inter alia typically conceived so as to depend on the nominal output and/or the size of the diameter, respectively, of the rotor.

On account of the provision of the planetary-gearbox-free electric actuator drive and the disposal of a non-planetary gearbox resulting therefrom, the latter accordingly not being or comprising a planetary gearbox, respectively, the number of the gearbox stages required can be reduced to one gearbox stage or to two gearbox stages. On account of the reduction of the gearbox stages of this type, apart from the significant saving in terms of weight, the susceptibility of the gearbox to wear is moreover reduced. Moreover, each gearbox stage in turn typically results in play in the gearbox, this having a disadvantageous effect on the performance and the service life of the gearbox, such that an improvement in terms of the susceptibility to defects is also associated with the planetary-gearbox-free electric actuator drives.

According to one further particularly preferred variant of embodiment of the nacelle it is provided that the gearbox is configured as a toothed-pin gearbox, preferably having a plurality of movable toothed pins and/or furthermore preferably having a drive element which is configured as profiled disk having one, two, or a plurality of elevations. It is in particular preferable that the toothed-pin gearbox has a stationary ring gear, a rotatable ring gear within the stationary ring gear, and a non-round profiled disk within said rotatable ring gear, said ring gears and profiled disk preferably being disposed so as to be coaxial. The profiled disk is furthermore preferably drivable by a motor. The rotatable ring gear moreover has one, two, or a plurality of toothed pins which in the tangential direction can transmit a force to the rotatable ring gear.

According to one further preferred variant of embodiment of the nacelle it is provided that the gearbox has an input shaft and an output shaft, wherein a force transmission from the input shaft to the output shaft is performed by toothed pins that are moved in a translatory manner, the translatory direction of said toothed pins preferably being aligned so as to be radial to the input shaft and/or the output shaft.

The motor preferably rotatably drives a profiled disk, wherein toothed pins are disposed in a radial alignment on an external circumferential face of the profiled disk. The toothed pins, in the circumferential direction, thus in the tangential direction, are furthermore connected to a rotatable ring gear, wherein the profiled disk is disposed so as to be coaxial within said ring gear. The rotatable ring gear in turn is disposed so as to be coaxial in the stationary ring gear having an internal toothing, without being in direct contact with said stationary ring gear. The contact between the rotatable ring gear and the stationary ring gear is implemented indirectly by way of the toothed pins. The rotatable ring gear within the stationary ring gear can in particular be driven by tangential forces by successively displacing the toothed pins in the radial direction through the non-round profiled disk and by a corresponding disposal of the toothed pins and a configuration of the toothing in the stationary ring gear. The tangential forces are transmitted to the rotatable ring gear by the toothed pins, wherein the tangential forces on the toothed pins in turn are created by shear forces. The shear forces are created by way of the non-centrical engagement of the toothed pins in toothing clearances of the stationary ring gear. A first gearbox stage of the planetary-gearbox-free actuator drive can thus be implemented. A further gearbox stage can be implemented by coupling the rotatable ring gear to a further, preferably inner, profiled disk which in turn by way of toothed pins drives a rotatable ring gear with in a stationary ring gear.

According to one further particularly preferred variant of embodiment of the nacelle it is provided that the gearbox per gearbox stage has a gearing from 10 to 100. It is particularly preferable that the gearing is 20 to 90, and/or 30 to 80, and/or 40 to 70, and or 80 to 100, and/or 10 to 30, and/or 10 to 20, and/or 10 to 15, and/or 15 to 30, and/or 15 to 20.

According to one further particularly preferred variant of embodiment of the nacelle it is provided that the planetary-gearbox-free electric actuator drive comprises a brake which is preferably disposed on a stationary ring gear of the gearbox and is configured for accelerating a shaft of the gearbox. A brake disk communicating with the brake is preferably disposed on a shaft of the planetary-gearbox-free electric actuator drive, wherein the disposal between the motor and the first gearbox stage is particularly preferable. Said acceleration is preferably configured so as to be negative such that the brake is capable of decelerating the rotating speed of a shaft of the gearbox. The brake is in particular configured as a holding brake so as to hold the gondola so as to face the wind in the case of very minor deviations in the yaw angle. The deviation in the yaw angle is in particular the difference between a current wind direction and the wind direction to which the gondola is currently aligned. For an established deviation in the yaw angle, for example of plus/minus 10 arc degrees, the gondola is preferably locked relative to the tower by the holding brake and does not continuously track the wind.

According to one further aspect, provided is a rotor for a wind power installation, in particular a wind power installation having a nominal output of more than 3000 kW, having a rotor hub and at least one rotor blade, having at least one pitch drive that is used for the rotor blade adjustment, wherein the at least one pitch drive is configured as a planetary-gearbox-free electric actuator drive. A rotor of this type is in particular configured for a wind power installation having a nominal output of more than 500 kW, and/or more than 1000 kW, and/or more than 1500 kW, and/or more than 2000 kW, and/or more than 2500 kW, and/or more than 3000 kW, and/or more than 3500 kW, and/or more than 4000 kW, and/or more than 4500 kW, and/or more than 5000 kW, and/or more than 5500 kW, and/or more than 6000 kW.

The rotor comprises a rotor hub which is disposed and configured such that one, two, or a plurality of rotor blades can be disposed on said rotor hub. It is particularly preferable for three rotor blades to be disposed on the rotor hub. The rotor moreover has at least one pitch drive for the rotor blade adjustment. The pitch drive is preferably disposed and configured for adjusting about a longitudinal axis of the respective rotor blade one, two, or a plurality of rotor blades which are disposed on the rotor hub. It is in particular preferable for one, two, or a plurality of separate pitch drives for the rotor blade adjustment to be disposed for each rotor blade. The pitch drive is configured as a planetary-gearbox-free electric actuator drive such that the pitch drive comprises an actuator drive having a gearbox, wherein the latter is configured as a non-planetary gearbox and thus is not, or does not comprise, respectively, a planetary gearbox. In terms of the definition of the planetary gearbox, reference is made to the above description of the first aspect.

Reducing component weights and/or functional group weights offers a multiplicity of advantages. The rotor is typically a moving component of the wind power installation and thus a moving mass. In the case of technical systems it is typically the objective to reduce the moving mass, since moving masses cause vibrations which are typically to be balanced, on the one hand, and in turn transmit forces to other moving and/or non-moving components, on the other hand. On account of accelerations, higher forces are in particular transmitted to other components by way of moving masses than from other non-moving components. An ideally compact construction mode of the individual components is therefore preferred. The pitch drive per se and/or the rotor hub can be embodied so as to be smaller by providing planetary-gearbox-free electric actuator drives as a pitch drive, said planetary-gearbox-free electric actuator drives having a significantly smaller installation size than usual actuator drives, such that the entire gondola can optionally be embodied so as to be smaller.

On account of the planetary-gearbox-free electric actuator drives having a non-planetary gearbox, a higher output density and/or a higher load bearing capability and/or a higher torsional rigidity and/or a higher load bearing capability in the pitch drives can be achieved. Moreover, the gearbox can be provided with less play, and is furthermore suitable for the transmission of high torques. The planetary-gearbox-free electric actuator drives furthermore enable a higher flexibility in design and the optimization of the structural components. The planetary-gearbox-free electric actuator drives moreover typically have a lower weight such that said planetary-gearbox-free electric actuator drives are easier to handle in terms of assembly and/or maintenance. Furthermore, the motor brake, if required, can be provided in or ahead of, respectively, the first gearbox stage, such that a space requirement can be further reduced. Furthermore, the number of pitch drives per blade can optionally be reduced since the pitch drives now have a higher output density. This is particularly relevant in the case of large rotor blades. On account of this reduction, not only the constructive effort is reduced but the costs can also be minimized. Moreover, pitch drives of this type can push the boundaries of the technically feasible in that even larger rotor blades are enabled in the first place by way of high-output pitch drives of this type.

According to one preferred variant of embodiment of the rotor it is provided that the planetary-gearbox-free electric actuator drive comprises a gearbox having one gearbox stage. Conventional gearboxes, in particular planetary gearboxes, of electric actuator drives for the rotor blade adjustment typically have two or more gearbox stages so as to provide the required gearing from the motor to the sprocket. However, on account of the planetary-gearbox-free electric actuator drive according to the invention, the required gearing can be provided by way of a single gearbox stage such that the gearbox to be used has more compact dimensions and a lower weight. Moreover, a gearbox having a lower number of gearbox stages is characterized by less wear and in particular by less play, such that further advantages can be implemented here.

The rotating speed of the motor in pitch drives can be, for example, in a range between 900 to 3600 revolutions per minute. The rotating speed or the adjustment speed, respectively, of the rotor blades is preferably typically 2 to 6 arc degrees per second, but, for instance in emergencies, can also be up to 12 arc degrees per second, for example. The gearing from an output sprocket of the pitch drive to a ring gear of the wind power installation can be, for example, between 180 and 250, wherein said gearing is typically conceived so as to inter alia depend on the nominal output and/or the size or the diameter, respectively, of the rotor.

According to one further preferred variant of embodiment of the rotor it is provided that the gearbox per gearbox stage has a gearing from 10 to 250. It is in particular preferable for the gearing to be 20 to 200, and/or 30 to 150, and/or 40 to 120, and/or 150 to 250, and/or 100 to 250, and/or 10 to 30, and/or 10 to 20, and/or 10 to 15, and/or 15 to 30, and/or 15 to 20.

According to one further particularly preferred variant of embodiment of the rotor it is provided that the planetarygearbox-free electric actuator drive comprises a brake which is preferably disposed on a stationary ring gear of the gearbox and/or is configured for accelerating a shaft of the gearbox.

According to one further particularly preferred variant of embodiment of the rotor it is provided that the gearbox is configured as a toothed-pin gearbox, preferably having a plurality of movable toothed pins and/or furthermore preferably having a drive element which is configured as a profiled disk having one, two, or a plurality of elevations. It is in particular preferable that the toothed-pin gearbox has a stationary ring gear, a rotatable ring gear within the stationary ring gear, and a non-round profiled disk within said rotatable ring gear, said ring gears and profiled disk preferably being disposed so as to be coaxial. The profiled disk is furthermore preferably drivable by a motor. The rotatable ring gear moreover has one, two, or a plurality of toothed pins which in the tangential direction can transmit a force to the rotatable ring gear.

According to one further particularly preferred variant of embodiment of the rotor it is provided that the gearbox has an input shaft and an output shaft, wherein a force transmission from the input shaft to the output shaft is performed by toothed pins that are moved in a translatory manner, the translatory direction of said toothed pins preferably being aligned so as to be radial to the input shaft and/or the output shaft. The toothed pins are preferably disposed in such a manner that said toothed pins are drivable in the radial direction by the profiled disk, in the circumferential direction are coupled to the rotatable ring gear, and moreover are disposed such that said toothed pins by way of an engagement end can engage in an internal toothing of the stationary ring gear.

In terms of further advantages, variants of embodiment, and details of the embodiment of the rotor and the potential refinements thereof, in particular of the planetary-gearbox-free electric actuator drive, reference is also made to the above description pertaining to the corresponding features and refinements of the nacelle, in particular of the planetary-gearbox-free electric actuator drive.

According to one further aspect, provided is a wind power installation, in particular a wind power installation having a nominal output of more than 3000 kW, having a tower and a nacelle that is disposed on an upper end of the tower, and a rotor, wherein the nacelle is a nacelle according to at least one of the variants of embodiment discussed above, and/or the rotor is a rotor according to at least one of the variants of embodiment discussed above. A wind power installation of this type is distinguished in that the pitch drives and/or the azimuth drives have a compact construction mode. On account thereof, the rotor hub and/or the machine support and/or the tower top and/or the gondola can be designed so as to be more compact, for example. Furthermore, the surrounding components can be designed or disposed in an improved manner.

On account of the reduced number of gearbox stages in the pitch drive and/or in the azimuth drive, a wind power installation can furthermore be distinguished by a reduced susceptibility to defects. Moreover, the assembly and the maintenance of the wind power installation are simplified. Furthermore, on account of the planetary-gearbox-free electrical actuator drives having a non-planetary gearbox, as explained, a higher output density, and/or a higher load bearing capability, and/or a higher torsional rigidity in the pitch drives and/or azimuth drives can be achieved. Moreover, the gearbox can be provided so as to have less play and so as to furthermore be suitable for the transmission of high torques.

According to a further aspect, provided is a planetary-gearbox-free electric actuator drive, in particular having a toothed-pin gearbox, as a pitch drive for the rotor blade adjustment of rotor blades of a rotor of a wind power installation, in particular a wind power installation having a nominal output of more than 3000 kW, and/or as an azimuth drive for the wind-direction tracking of a nacelle of a wind power installation, in particular a wind power installation having a nominal output of more than 3000 kW.

According to one further aspect, provided is a method for the wind-direction tracking of a nacelle of a wind power installation, in particular a wind power installation having a nominal output of more than 3000 kW, said method comprising providing a nacelle according to at least one of the above described variants of embodiment, actuating the at least one planetary-gearbox-free electric actuator drive, driving a sprocket and rotating the nacelle about a preferably vertical rotation axis of the nacelle.

According to one further aspect, provided is a method for the rotor blade adjustment of rotor blades of a rotor of a wind power installation, in particular a wind power installation having a nominal output of more than 3000 kW, said method comprising providing a rotor according to at least one of the preceding variants of embodiment, actuating at least one planetary-gearbox-free electric actuator drive, driving a sprocket and rotating a rotor blade about a longitudinal axis.

The methods described herein and the potential refinements thereof have features and method steps, respectively, which render said methods particularly suitable for use in a nacelle and/or a rotor and the respective refinements thereof. In terms of further advantages, variants of embodiment, and details of embodiments of said further aspects and the potential refinements thereof reference is also made to the above description pertaining to the corresponding features and refinements of the nacelle and/or the rotor.

BRIEF DESCRIPTION OF THE SEVERAL VIEWS OF THE DRAWINGS

Preferred embodiments of the invention will be explained in an exemplary manner by means of the appended figures in which.

DETAILED DESCRIPTION

Figure 1:
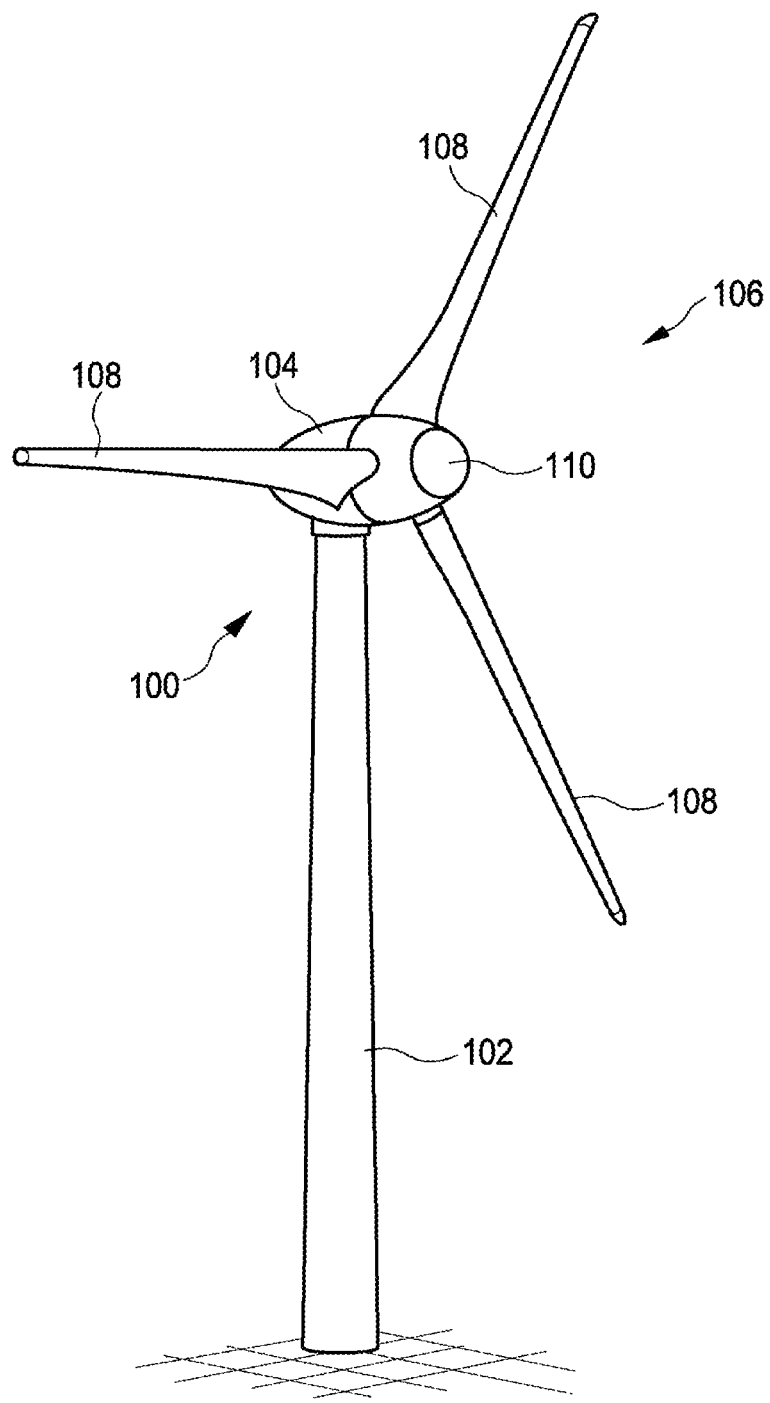
FIG. 1 shows a schematic view of a wind power installation.

Identical elements, or elements that are substantially functionally identical or functionally similar, are identified by the same reference signs in the figures. FIG. 1 shows a schematic view of an exemplary embodiment of a wind power installation. FIG. 1 shows in particular a wind power installation 100 having a tower 102 and a gondola 104. A rotor 106 having three rotor blades 108 and a spinner 110 is disposed on the gondola 104. The rotor 106 when in operation is set in rotating motion by the wind and on account thereof drives a generator on the gondola 104. The wind power installation 100 according to FIG. 1 preferably has a nacelle and/or a rotor.

Figure 2:
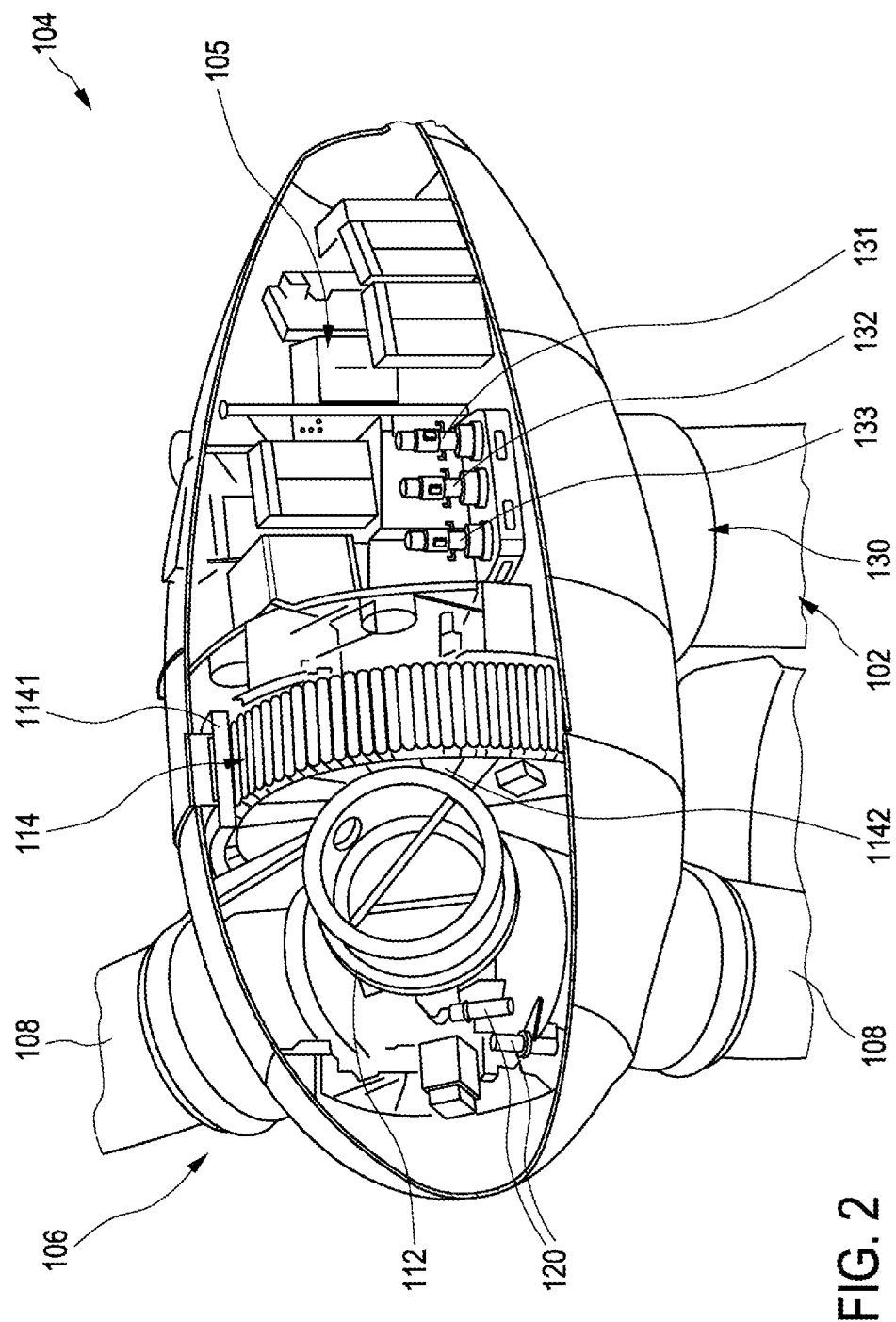
FIG. 2 shows a schematic cut-away three-dimensional view of a fragment of a wind power installation known in the prior art.

FIG. 2 shows a schematic cut-away three-dimensional view of a section of a wind power installation known in the prior art. FIG. 2 shows in particular the gondola 104 having a nacelle 105, wherein a rotor 106 is disposed on the gondola 104. The rotor 106 comprises in total three rotor blades 108 which are disposed on the rotor hub 112. The rotor blades are presently disposed so as to be rotatable about a longitudinal axis. The rotation of a rotor blade about the longitudinal axis thereof is enabled by means of a pitch drive. A generator 114 is disposed on an axle journal that is connected in a rotationally rigid manner to the rotor hub 112, wherein the generator rotor 1142 is in particular connected in a rotationally rigid manner to the shaft. A generator stator 1141 is configured as a ring, wherein the generator rotor 1142 rotates in a coaxial manner within the generator stator 1141. The gondola 104 having the rotor 106 is rotatably disposed on a tower 102. Between the tower 102 and the gondola 104, an azimuth unit 130 which is disposed as a tubular element is disposed on the region of the gondola 104 that faces the tower 102. The azimuth unit 130 is preferably disposed in a rotationally rigid manner on the gondola 104 and furthermore preferably on the machine support and is thus furthermore preferably a component part of the nacelle 105. The azimuth unit 130 furthermore has a central axis which in the operating state of the wind power installation is disposed so as to be substantially coaxial with a central axis of the tower 102.

In order for the gondola 104 on the tower 102 to be rotated in a substantially horizontal plane, a first azimuth drive 131, a second azimuth drive 132, and a third azimuth drive 133 are inter alia disposed within the azimuth unit 130 and within the nacelle 105, said azimuth drives 131, 132, 133 being configured for rotating the gondola 104 together with the azimuth unit 130 and the rotor 106 relative to the tower 102 in a substantially horizontal plane. To this end, one externally toothed sprocket per azimuth drive 131, 132, 133 engages in an internally toothed ring mount which is disposed in a rotationally rigid manner on the tower 102. The height of the azimuth unit 130 in the longitudinal direction of the tower 102 is inter alia influenced by the construction height of the azimuth drives 131, 132, 133. The higher the construction height of the azimuth drives 131, 132, 133, the higher typically also the height of the azimuth unit 130. It can in particular be seen in FIG. 2 that the azimuth drives 131, 132, 133 used in the prior art have a construction height which requires a large azimuth unit 130, since a disposal of azimuth drives 131, 132, 133 of such a size is not possible within a compact machine support and/or a compact gondola 104, or is possible only by way of significant disadvantages.

The azimuth unit 130 is part of the moving components of a wind power installation. Therefore, an ideally small construction size is desirable so as to reduce the moving mass such that forces to be applied into alia by actuator drives are as low as possible. Furthermore, the constructive complexity for designing the azimuth unit 130 is so high that an azimuth unit 130 of reduced size, or rendering the latter obsolete, is often pursued. This applies in particular to comparatively large wind power installations having nominal loads of more than 500 kW, and/or more than 1000 kW, and/or more than 1500 kW, and/or more than 2000 kW, and/or more than 2500 kW, and/or more than 3000 kW, and/or more than 3500 kW, and or more than 4000 kW, and/or more than 4500 kW, and/or more than 5000 kW, and/or more than 5500 kW, and/or more than 6000 kW. The likewise large construction height of the pitch drives 120 can further be seen in FIG. 2, such that the pitch drives 120 in a manner analogous to that of the azimuth drives 131, 132, 133 have a sizeable space requirement.

Figure 3A:
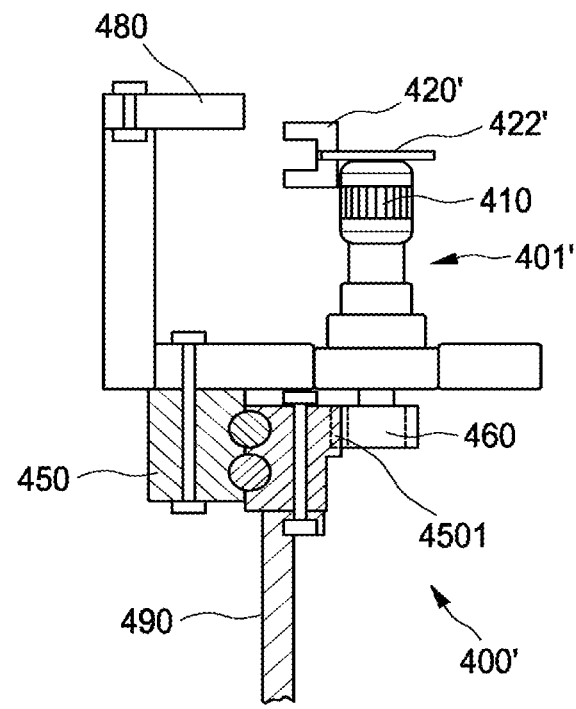
FIG. 3a shows a schematic sectional two-dimensional view of part of an azimuth unit having an azimuth drive known in the prior art.
Figure 3B:
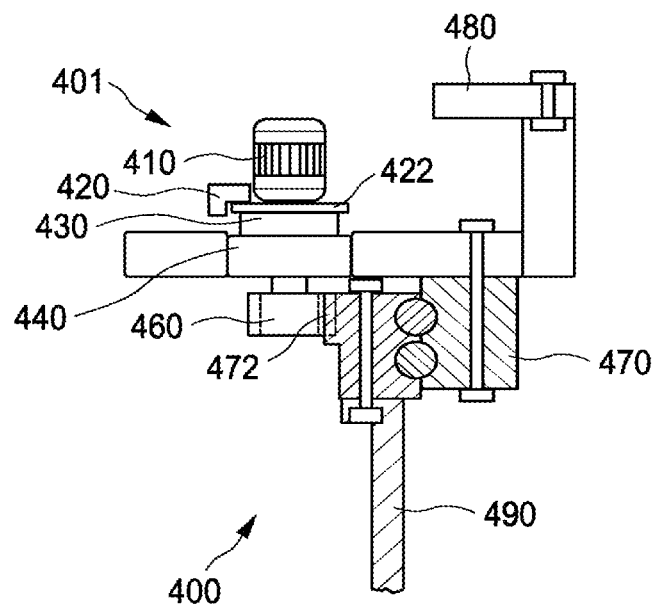
FIG. 3b shows a schematic sectional two-dimensional view of an exemplary embodiment of part of an azimuth unit having a planetary-gearbox-free electric azimuth drive.

FIG. 3a shows a schematic sectional two-dimensional view of part of an azimuth unit having an azimuth drive known in the prior art. By contrast, FIG. 3b shows a mirrored situation having a planetary-gearbox-free electric azimuth drive according to an embodiment. The significantly lower space requirement in the nacelle having an azimuth unit according to FIG. 3b as compared to a nacelle having an azimuth unit according to FIG. 3a for a wind power installation of identical nominal output becomes immediately evident.

The azimuth unit 400' according to the prior art in FIG. 3a is disposed and configured for rotating a machine support 480 in a horizontal plane, relative to a tower of which the wall 490 is partially illustrated. The machine support 480 together with the azimuth unit 400' is rotatably mounted on the tower, wherein said mounting is presently implemented by way of a double-row spherical roller bearing 450. The roller bearing part which is fastened in a rotationally rigid manner to the tower wall 490 moreover has an internal toothing 4501.

The azimuth unit 400 according to FIG. 3b is connected in a rotationally rigid manner to the machine support 480. An azimuth drive 401 is disposed within the azimuth unit 400 in such a manner that a sprocket 460 of the azimuth drive 401 engages in the internal toothing 472 of that part of the roller bearing 450 that is fastened to the tower wall 490. The sprocket 460 is driven by a motor 410, wherein only one first gearbox stage 430 and one second gearbox stage 440 are disposed between the motor 410 and the sprocket 460, such that a high rotating speed of the motor 410 is converted to a low rotating speed having a high torque of the sprocket 460. The azimuth unit 400 moreover has a motor brake 420 which is disposed and configured for decelerating a brake disk 422 which is disposed between the first gearbox stage 430 and the motor 410. On account thereof, the space requirement and the complexity in terms of construction assembly can be reduced again as compared to the arrangement known in the prior art, for example from FIG. 3a.

FIG. 3a by contrast shows a schematic sectional two-dimensional view of an azimuth unit known in the prior art. The azimuth drive 401' of the azimuth unit 400' according to the prior art, in particular and as compared to the azimuth unit 400 shown in FIG. 3b, differs in that said azimuth drive 401' has a total of four gearbox stages between the motor 410 and the output sprocket 460. Said gearbox stages in the prior art are in particular configured as planetary gearboxes. The azimuth drive 401' moreover has an integrated brake which comprises a brake disk 422' and a brake 420', wherein the brake disk 422' and the brake 420' are disposed on that side of the motor 410 that faces away from the gearbox.

Apart from the lower space requirement and the complexity in terms of construction and assembly, the embodiment described herein furthermore enables a lower number of moving elements to be provided such that the susceptibility to defects and/or the maintenance complexity can be reduced.

Figure 4:
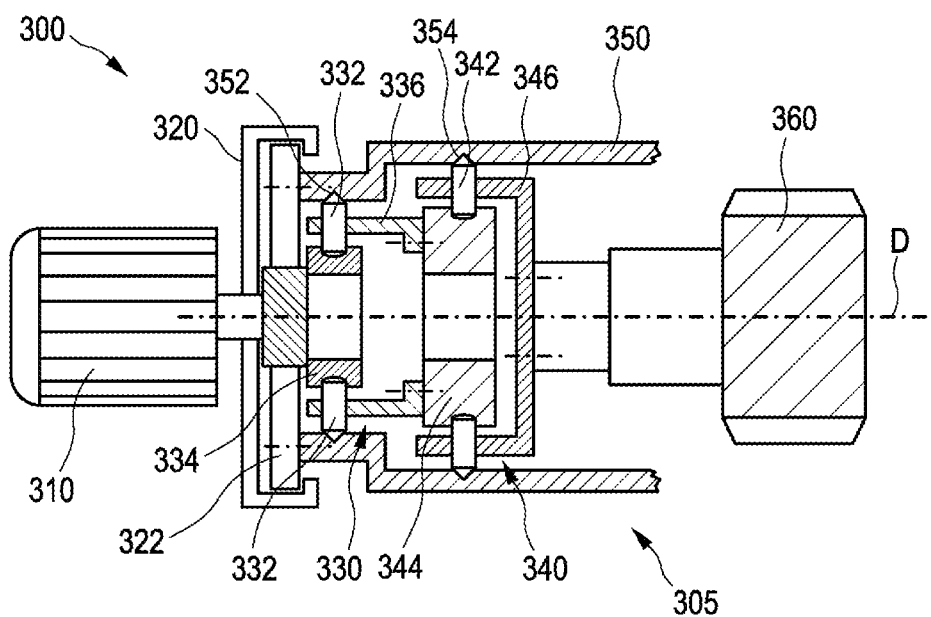
FIG. 4 shows a sectional lateral view of an exemplary embodiment of a planetary-gearbox-free electric actuator drive.

FIG. 4 shows a sectional lateral view of an exemplary embodiment of a planetary-gearbox-free electric actuator drive such as can be used, for example, in an installation situation as in FIG. 3b. As can also be seen in FIG. 4, a particularly compact construction of the actuator drive can be implemented such that the use as a pitch drive and/or as an azimuth drive is preferable specifically also in the case of installations having a high nominal output.

The planetary-gearbox-free electric actuator drive 300 illustrated in FIG. 4 comprises substantially gearbox 305, a motor 310, and a sprocket 360. The motor 310 rotatingly drives a first profiled disk 334 about a rotation axis D. The first profiled disk 334 in a manner orthogonal to the rotation axis D has a non-round cross section, wherein an oval cross section or a cam cross section are possible, for example. A plurality of toothed pins 332 are disposed on the radial circumferential face of the first profiled disk 334. The toothed pins have a longitudinal axis which is disposed so as to be substantially parallel to a radial direction in relation to the rotation axis D. The toothed pin 332 on the end thereof that faces away from the rotation axis has a tapered geometry which is configured and disposed so as to engage in an internal toothing and therein to cause a sheer force in the circumferential direction. The toothed pin 332 at this end has in particular a geometry such as that of a gear wheel of a gearbox. The toothed pins 332 are disposed in such a manner that said toothed pins can only perform a translatory movement, wherein the translatory movement is aligned so as to be substantially parallel to a radial direction of the rotation axis D. The toothed pins 332 in the tangential direction of the first profiled disk 334 are not connected in a rotationally rigid manner to the first profiled disk 334 such that the profiled disk can preferably cause exclusively a translatory movement in the toothed pins 332. The toothed pins 332 are furthermore preferably disposed on a first ring gear 336 so as to be movable in the radial direction. By contrast, the toothed pins 332 in the tangential direction are preferably fixedly connected to the first ring gear 336, in particular connected in a rotationally rigid manner. A stationary ring gear 350 which is disposed in a locationally fixed manner in particular relative to the first profiled disk 334 and the first ring gear 336 is disposed beside the first profiled disk 334 and the first ring gear 336, so as to be coaxial with said first profiled disk 334 and said first ring gear 336.

The stationary ring gear 350 in the radial direction of the first profiled disk 334 and in the direction of the translatory movement direction of the toothed pins 332 has a first internal toothing 352. The first internal toothing 352 of the stationary ring gear 350 is in particular characterized in that said first internal toothing 352 has a tooth spacing which is a non-integer multiple of the tooth spacing of the toothed pins 332. The tooth spacing is preferably determined from the tooth head to the tooth head of two neighbouring teeth. A non-integer multiple here means in particular that a quotient from the two spacings does not result in an integral number such as 1, 2, or 3. However, a non-integer multiple can also mean a number below 1, for example 0.8. On account of said disposal of the first profiled disk 334, of the toothed pins 332, of the first ring gear 336, as well as of the first toothing 352 in the stationary ring gear 350, the first ring gear 336 rotates about the rotation axis D as soon as the motor 310 rotatably drives the non-round profiled disk 334. This is in particular performed by the engagement of at least one toothed pin 332 in the first toothing 352, wherein no exactly centric engagement of the toothed pin 332 in a tooth intermediate space of the first toothing 352 is performed on account of the tooth spacings explained above. On account thereof, shear forces which, on account of the connection of the toothed pins 332 and of the first ring gear 336, which connection in the tangential direction is rotationally rigid, are transmitted from the toothed pins 332 to the ring gear 336. The first profiled disk 334 and the first ring gear 336, in conjunction with the toothed pins 332, thus represent the first gearbox stage 330 of the gearbox 305.

A second gearbox stage 340 is provided in order to achieve a higher gearing of the gearbox 305. The second gearbox stage 340 comprises a second profiled disk 344 which is driven by the first ring gear 336. In a manner analogous to that of the first gearbox stage 330, the second profiled disk 344 transmits the rotating movement to a translatory movement of the toothed pins 342, the latter on account of the second toothing 354 in the stationary ring gear 350 and a connection of the toothed pins 342 to a second ring gear 346 that in the tangential direction is rotationally rigid, implementing a gearing. The second ring gear 346 is connected in a rotationally rigid manner to a sprocket 360 such that a high gearing from the motor 310 to the sprocket 360 can be achieved.

A brake 320 which by way of a brake disk 322 can implement an acceleration is moreover presently provided. The brake disk 322 is disposed in a region which is disposed between the motor 310 and the first profiled disk 334. The brake disk 322 is disposed in a rotationally rigid manner on the shaft disposed here. The brake 320 is preferably disposed on the stationary ring gear 350 such that the brake 320 can engage on the brake disk 322 and thus can accelerate the latter. A negative acceleration is in particular provided here such that a rotating speed of the brake disk 322 is decelerated by the brake 320.

Figure 5:
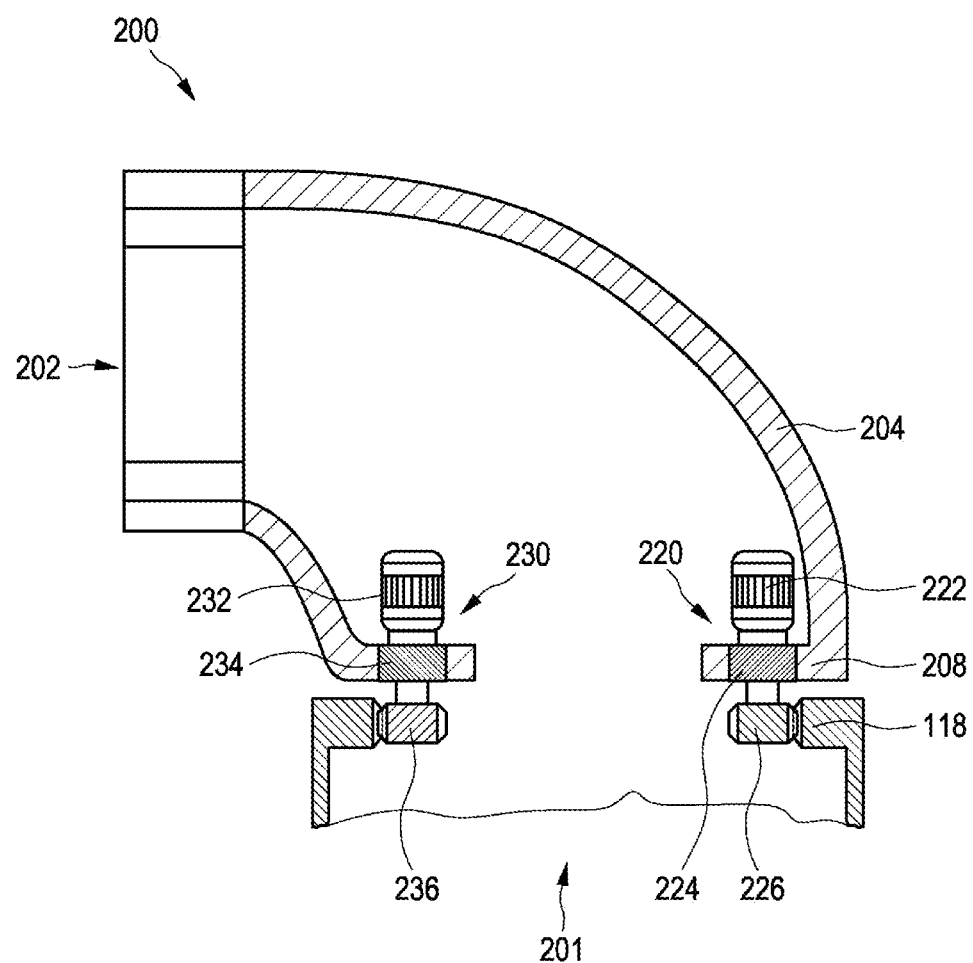
FIG. 5 shows a schematic two-dimensional sectional illustration of an exemplary embodiment of a machine support.

FIG. 5 shows a schematic two-dimensional sectional illustration of an exemplary embodiment of a machine support having planetary-gearbox-free azimuth drives disposed thereon. The machine support 200 has a tubular geometry which is enclosed by a wall 204. The machine support 200 has two large entry openings, wherein the first entry opening 201 when in operation is disposed and configured on a tower flange, and the second entry opening 202 is disposed and configured for receiving a rotary functional group. A first passage direction of the first entry opening on the tower flange when in operation has a vertical alignment which when in operation is aligned so as to be substantially parallel to the longitudinal axis of the tower. The second entry opening 202 of the machine support 200 has a second passage direction which is aligned so as to be orthogonal to the first passage direction.

Planetary-gearbox-free electric azimuth drives 220, 230 are disposed on the machine support according to FIG. 5. The first azimuth drive 220 and the second azimuth drive 230 are disposed in the region of the first entry opening on an inwardly protruding machine support flange 208. The stationary ring gear which in FIG. 4 is provided with the reference sign 350 is disposed here in a rotationally rigid manner within an opening of the machine support flange 208. The rotation axis of the azimuth drives 220, 230 is aligned so as to be parallel to the tower axis, or to the entry direction of the first entry opening of the machine support, said entry opening facing the tower, respectively. The tower of the wind power installation at the tower top end which faces the machine support has a radially internally toothed tower flange 118. The azimuth drives 220, 230 and the radially internally toothed tower flange 118 are disposed in such a manner that the sprockets 226, 236 of the azimuth drives 220, 230 engage in the toothing of the radially internally toothed tower flange 118.

A particularly advantageous wind power installation can be provided on account of compact azimuth drives or pitch drives of this type, respectively. The azimuth drives can be installed in a compact machine support such as is shown in FIG. 5, for example, such that the azimuth drives no longer require a dedicated housing and/or space for other components in the region surrounding the machine support becomes vacant. Furthermore, the weight of the gondola or of the nacelle, respectively, is reduced on account thereof. Moreover, the azimuth unit of a wind power installation on account of a smaller construction size of the planetary-gearbox-free actuator drives used can be embodied in a significantly more compact manner, or can even be entirely omitted, when the azimuth drives are integrated directly in the machine support, as is illustrated in FIG. 5. Moreover, the azimuth unit in most instances can optionally be dispensed with since the azimuth drives are disposed on a machine support.

The weight of the rotating mass in the rotor can in particular be reduced by the use of compact actuator drives of this type in the pitch drives, such that further advantages could be achieved in the mechanical field, wherein advantages in terms of dynamic loads can in particular be achieved. It is furthermore an advantage that the planetary-gearbox-free actuator drives are less susceptible to wear and may have a higher efficiency such that the maintenance necessity and performance of the wind power installation can be enhanced, by way of which energy can inter alia be generated in a more resource-friendly manner and the costs of the wind power installation and thus also of the power generation can be reduced.

LIST OF REFERENCE SIGNS

100 Wind power installation
102 Tower
104 Gondola
105 Nacelle
106 Rotor
108 Rotor blade
110 Spinner
112 Rotor hub
114 Generator
118 Radially internally toothed tower flange
120 Pitch drive
130 Azimuth unit
131 First azimuth drive
132 Second azimuth drive
133 Third azimuth drive
200 Machine support
201 First entry opening
202 Second entry opening
204 Wall
208 Machine support flange
220 First planetary-gearbox-free electric actuator drive
222 Motor, first pitch adjustment unit
224 Gearbox
226 Sprocket
230 Second planetary-gearbox-free electric actuator drive
232 Motor, second pitch adjustment unit
234 Gearbox
236 Sprocket
300 Planetary-gearbox-free electric actuator drive
305 Gearbox
310 Motor
320 Brake
322 Brake disk
330 First gearbox stage
332 Toothed pins
334 First profiled disk
336 First ring gear
340 Second gearbox stage
342 Toothed pins
344 Second profiled disk
346 Second ring gear
350 Stationary ring gear
352 First internal toothing of the stationary ring gear
354 Second internal toothing of the stationary ring gear
360 Output sprocket
400, 400' Azimuth unit
401, 401' Azimuth drive
410 Motor
420, 420' Brake
422, 422' Brake disk
430 First gearbox stage
440 Second gearbox stage
450 Roller bearing
460 Output sprocket
470 Azimuth bearing
472 Toothing
480 Machine support
490 Tower wall
1141 Generator stator
1142 Generator rotor
4501 Toothing of roller bearing
D Rotation axis

The invention claimed is:

1. A nacelle for a wind power installation having a nominal output of more than 3000 kilowatts (kW), comprising:
at least one azimuth drive that is a planetary-gearbox-free electric actuator drive and configured to track a wind direction of the nacelle, the planetary-gearbox-free electric actuator drive including a first toothed-pin gearbox stage and a second toothed-pin gearbox stage having a higher gearing than the first toothed-pin gearbox stage, wherein the second toothed-pin gearbox stage includes:
a plurality of toothed pins that are movable; and
a profiled disk, wherein the plurality of toothed pins are disposed on a radial circumferential face of the profiled disk on an end of the profiled disk facing away from an input shaft or an output shaft, wherein the plurality of toothed pins perform a translatory movement radial to the input shaft or the output shaft, and wherein a force transmission from the input shaft to the output shaft is performed by the translatory movement of the plurality of toothed pins.

2. The nacelle as claimed in claim 1, comprising:
machine support having the at least one azimuth drive disposed thereon.

3. The nacelle as claimed in claim 2, comprising:
a cavity in the machine support having the at least one azimuth drive partially or completely disposed within.

4. The nacelle as claimed in claim 3, wherein the cavity is configured as a housing for the at least one azimuth drive.

5. The nacelle as claimed in claim 1, wherein the planetary-gearbox-free electric actuator drive includes:
a stationary ring gear of the first toothed-pin gearbox stage or the second toothed-pin gearbox stage; and
a brake disposed on the stationary ring gear.

6. The nacelle as claimed in claim 5, wherein the output shaft is accelerated by the brake.

7. The nacelle as claimed in claim 1, wherein the first toothed-pin gearbox stage or the second toothed-pin gearbox stage has a gearing from 10 to 100 per gearbox stage.

8. A rotor for a wind power installation having a nominal output of more than 3000 kilowatts (kW), comprising:
   a rotor hub; and
   at least one rotor blade including at least one pitch drive used for adjusting the at least one rotor blade, wherein the at least one pitch drive is configured as a planetary-gearbox-free electric actuator drive including a first toothed-pin gearbox stage and a second toothed-pin gearbox stage having a higher gearing than the first toothed-pin gearbox stage, wherein the second toothed-pin gearbox stage includes:
      a plurality of toothed pins that are movable; and
      a profiled disk, wherein the plurality of toothed pins are disposed on a radial circumferential face of the profiled disk on an end of the profiled disk facing away from an input shaft or an output shaft, wherein the plurality of toothed pins perform a translatory movement radial to the input shaft or the output shaft, and wherein a force transmission from the input shaft to the output shaft is performed by the translatory movement of the plurality of toothed pins.

9. The rotor as claimed in claim 8, wherein:
   the first toothed-pin gearbox stage or the second toothed-pin gearbox stage has a gearing of 10 to 250 and includes:
      a stationary ring gear; and
      a shaft; and
   the planetary-gearbox-free electric actuator drive includes a holding brake disposed on the stationary ring gear and configured to accelerate the shaft.

10. The rotor as claimed in claim 9, wherein the first toothed-pin gearbox stage or the second toothed-pin gearbox stage has a gearing of 150 to 250.

11. The wind power installation, comprising:
   a tower;
   a nacelle disposed on an upper end of the tower; and
   the rotor as claimed in claim 8.

12. A method for wind-direction tracking of a nacelle of a wind power installation having a nominal output of more than 3000 kilowatts (kW), comprising:
   actuating at least one planetary-gearbox-free electric actuator drive including a first toothed-pin gearbox stage and a second toothed-pin gearbox stage having a higher gearing than the first toothed-pin gearbox stage, wherein the second toothed-pin gearbox stage includes:
      a plurality of toothed pins that are movable; and
      a profiled disk, wherein the plurality of toothed pins are disposed on a radial circumferential face of the profiled disk on an end of the profiled disk facing away from an input shaft or an output shaft, wherein the plurality of toothed pins perform a translatory movement radial to the input shaft or the output shaft, and wherein a force transmission from the input shaft to the output shaft is performed by the translatory movement of the plurality of toothed pins;
   driving a sprocket; and
   rotating the nacelle about a rotation axis of the nacelle.

13. A method for rotor blade adjustment of a plurality of rotor blades of a rotor of a wind power installation having a nominal output of more than 3000 kilowatts (kW), comprising:
   actuating at least one planetary-gearbox-free electric actuator drive including a first toothed-pin gearbox stage and a second toothed-pin gearbox stage having a higher gearing than the first toothed-pin gearbox stage, wherein the second toothed-pin gearbox stage includes:
      a plurality of toothed pins that are movable; and
      a profiled disk, wherein the plurality of toothed pins are disposed on a radial circumferential face of the profiled disk on an end of the profiled disk facing away from an input shaft or an output shaft, wherein the plurality of toothed pins perform a translatory movement radial to the input shaft or the output shaft, and wherein a force transmission from the input shaft to the output shaft is performed by the translatory movement of the plurality of toothed pins;
   driving a sprocket; and
   rotating a rotor blade of the plurality of rotor blades about a longitudinal axis.

* * * * *